United States Patent
Lueken

(10) Patent No.: US 10,410,232 B1
(45) Date of Patent: Sep. 10, 2019

(54) SYSTEMS AND METHODS FOR PRIORITIZING DEFAULT PAYMENT OPTIONS IN VIRTUAL WALLETS

(71) Applicant: Harold Lueken, New York, NY (US)

(72) Inventor: Harold Lueken, New York, NY (US)

(*) Notice: Subject to any disclaimer, the term of this patent is extended or adjusted under 35 U.S.C. 154(b) by 280 days.

(21) Appl. No.: 15/644,120

(22) Filed: Jul. 7, 2017

Related U.S. Application Data

(60) Provisional application No. 62/359,968, filed on Jul. 8, 2016.

(51) Int. Cl.
| | |
|---|---|
| *G06Q 30/02* | (2012.01) |
| *G06Q 20/32* | (2012.01) |
| *G06Q 20/38* | (2012.01) |
| *G06Q 20/40* | (2012.01) |
| *H04B 5/00* | (2006.01) |

(52) U.S. Cl.
CPC ..... *G06Q 30/0222* (2013.01); *G06Q 20/3223* (2013.01); *G06Q 20/3278* (2013.01); *G06Q 20/3821* (2013.01); *G06Q 20/4014* (2013.01); *H04B 5/0025* (2013.01)

(58) Field of Classification Search
CPC .................................................. G06Q 20/3278
See application file for complete search history.

(56) References Cited

U.S. PATENT DOCUMENTS

| | | | |
|---|---|---|---|
| 6,298,997 | B1 | 10/2001 | Jarrett et al. |
| 2003/0115096 | A1 | 6/2003 | Reynolds et al. |
| 2005/0147225 | A1 | 7/2005 | Mallick et al. |
| 2006/0074769 | A1 | 4/2006 | Looney et al. |

(Continued)

FOREIGN PATENT DOCUMENTS

| | | |
|---|---|---|
| EP | 2626823 | 8/2013 |
| WO | 2015/130967 | 9/2015 |

OTHER PUBLICATIONS

Bustle, "Google's Voice-Paying App Would Let You Say "Yassss" To Pay For Brunch" [online], retrieved Aug. 3, 2017]. Retrieved from the Internet <URL: https://www.bustle.com/articles/146003-googles-voice-paying-app-would-let-you-say-yassss-to-pay-for-brunch>.

(Continued)

*Primary Examiner* — A. Hunter Wilder
(74) *Attorney, Agent, or Firm* — Bryan Cave Leighton Paisner LLP

(57) ABSTRACT

Techniques are disclosed for utilizing NFC, beacon, geofencing and/or other technologies to select default virtual cards in virtual wallets and to enable promotions for individuals who utilize the default virtual cards to conduct transactions. A reconfiguration signal that designates a virtual card to be a default virtual card is transmitted to a mobile device having an installed virtual wallet application. The virtual wallet application determines whether it includes stored information corresponding to the virtual card identified by the reconfiguration signal. In response to determining that the virtual wallet application includes the virtual card identified by the reconfiguration signal, the virtual wallet application updates or confirms a default card setting of the virtual wallet application to designate the virtual card identified by the reconfiguration signal as the default virtual card. Promotions may be applied to transactions involving the default virtual card for a predetermined period of time.

14 Claims, 4 Drawing Sheets

(56) References Cited

U.S. PATENT DOCUMENTS

| | | | |
|---|---|---|---|
| 2008/0262928 A1 | 10/2008 | Michaelis | |
| 2011/0185607 A1 | 8/2011 | Forster et al. | |
| 2011/0251892 A1 | 10/2011 | Laracey | |
| 2012/0109764 A1* | 5/2012 | Martin | G06Q 20/204 705/17 |
| 2013/0282459 A1* | 10/2013 | Smets | G06Q 20/045 705/14.23 |
| 2013/0317927 A1* | 11/2013 | Bush | G06Q 20/3278 705/21 |
| 2015/0019320 A1 | 1/2015 | Menendez et al. | |
| 2016/0094940 A1 | 3/2016 | Vigier | |

OTHER PUBLICATIONS

Business Wire, "Discover Announces Apple Pay Availability and 10% *Cashback Bonus®* Offer" [online], Sep. 9, 2015 [retrieved Aug. 3, 2017]. Retrieved from the Internet <URL: http://www.businesswire.com/news/home/20150909006702/en/Discover-Announces-Apple-Pay-Availability-10-Cashback#.VfGkeZ3BzRY>.

Hauck, C., "Banks Fight to be Default 'Apple Pay' Card in Battle to Boost Profits" [online], Sep. 16, 2014 [retrieved Aug. 3, 2017]. Retrieved from the Internet <URL: http://www.mactrast.com/2014/09/banks-fight-default-apple-pay-card-battle-boost-profits/>.

Henry, C., "Peter Thiel leads the march on foreign investment in UK and European fintech" [online], Jan. 11, 2016 [retrieved Aug. 3, 2017]. Retrieved from the Internet <URL: http://www.cbronline.com/news/verticals/finance/peter-thiel-leads-the-march-on-foreign-investment-in-uk-and-european-fintech-4773913>.

Luthi, B., "Discover Adds Apple Pay, Offers 10% Back for a Limited time" [online], Sep. 11, 2015 [retrieved Aug. 3, 2017]. Retrieved from the Internet <URL: https://www.nerdwallet.com/blog/credit-cards/discover-apple-pay-offers-10-percent-bonus-limited-time/>.

Perez, S., "Mobile Web Surfers Again Facing Unexpected Redirects To App Store, Native Apps" [online], Mar. 19, 2015 [retrieved Aug. 3, 2017]. Retrieved from the Internet <URL: https://techcrunch.com/2015/03/19/mobile-web-surfers-again-facing-unexpected-redirects-to-app-store-native-apps/>.

Rodgers, S., "Driving Usage with Apple Pay: What Most Issuers are Missing" [online], Apr. 21, 2015 [retrieved Aug. 3, 2017]. Retrieved from the Internet <URL: http://www.medialogic.com/financial-services-marketing/blog/driving-usage-with-apple-pay-what-most-issuers-are-missing/>.

Rowles, D., "About Those Insidious Mobile Ads That Hijack Your Phone and Redirect You to the App Store" [online], Jan. 9, 2016 [retrieved Aug. 3, 2017]. Retrieved from the Internet <URL: http://www.pallba.com/think_pieces/about-those-insidious-mobile-ads-that-hijack-your-phone-and-redirect-you-to-the-app-store.php>.

* cited by examiner

SYSTEMS AND METHODS FOR PRIORITIZING DEFAULT PAYMENT OPTIONS IN VIRTUAL WALLETS

CROSS-REFERENCE TO RELATED APPLICATIONS

The present application claims the benefit of U.S. Provisional Application No. 62/359,968 filed on Jul. 8, 2016, the contents of which is herein incorporated by reference in its entirety.

FIELD OF THE INVENTION

The present disclosure is related to providing incentives in connection with selecting payment options in a virtual wallet and, more particularly, to techniques for utilizing NFC, beacon, geo-fencing and/or other technologies to select default payment options in a virtual wallet and to enable promotions for customers who utilize the default payment options to conduct transactions within predetermined periods of time.

BACKGROUND

Virtual or digital wallets enable individuals to make purchases using electronic devices, such as a smartphones. Exemplary virtual wallets are included in connection with mobile payment services such as Apple Pay, Android Pay, Google Wallet, PayPal, and Bitcoin. The virtual wallets may store information for a plurality of virtual payment methods or options, each of which may correspond to a different credit card, debit card, store card or other payment option. Each payment option may be saved as a separate virtual card in the wallet. The stored information may include card information (e.g., card numbers, expiry dates, card types and security numbers), billing addresses, cardholder names and other information. When an individual desires to make a purchase, the individual can select one of the virtual cards in the virtual wallet to make the purchase.

The virtual wallet may be utilized to facilitate tap-to-pay purchases, in-app purchases and other types of purchases. Tap-to-pay purchases may be made using near-field communication (NFC). For example, to make purchases, individuals can simply place their mobile devices near a payment terminal that is compatible with contactless payment services. Certain contactless payment products may require individuals to provide a fingerprint or enter a passcode into a mobile device for identity verification purposes before purchases are made.

The virtual wallets may permit individuals to select a virtual card as a default payment option for making purchases. A credit card, debit card or store card that is selected as the default payment option will automatically be used by the virtual wallet to make a purchase unless an individual specifically selects another card to make a purchase. If an individual desires to use a payment option other than the default payment option to make a purchase, the individual must take several steps to do so. For example, the individual may be required to open the virtual wallet application, sort through a variety of virtual cards, select the virtual card that is to be used to make the purchase, place the individual's mobile device near a payment terminal while the selected virtual card is presented on a display of the device, and provide verification credentials (e.g., fingerprint or passcode credentials) to confirm the purchase. This process can be tedious and time-consuming.

Another technique for selecting a default card involves providing an individual with an application that enables the individual to preselect certain preferences for selecting the default card. For example, an individual may initially download and install an application on a mobile device. The individual may then open the application and utilize the application to specify various rules for selecting the default card. For example, the individual may specify that a specific card in the virtual wallet should be selected as the default card when the individual is making a purchase at specific store or retail location, or may specify that balances on gift cards should be expended before credit cards are utilized to make a purchase. Again, this technique can be very tedious and time-consuming for the individual because it requires various inputs and actions to be taken by the individual prior to making a purchase.

In addition to being tedious and time-consuming to set up and use, the aforementioned technique is also burdensome to individuals who wish to deactivate the default card selection rules because doing such requires the individual to take further actions and provide further inputs. For example, an individual who desires to deactivate the default card selection rules may be required to open the application, navigate through a series of interfaces and make a selection to change the settings that are currently being applied.

SUMMARY

The present disclosure is directed to techniques for automatically updating, selecting and/or confirming default payment options or default virtual card options associated with virtual wallet applications. The automated techniques can utilize a variety of different technologies to instantly and easily modify or update default card settings which store values for identifying the default payment options or default virtual card options for the virtual wallet applications. In certain embodiments, NFC-based technologies are utilized to set the default payment options or default virtual card options. In response to positioning NFC-enabled devices in close proximity to NFC-enabled signs or structures, reconfiguration signals are transmitted from the NFC-enabled signs or structures to the NFC-enabled devices with installed virtual wallet applications. In other embodiments, beacon-based technologies or geo-fencing technologies are utilized to set the default payment options or default virtual card options. The NFC, beacon and/or geo-fence technologies may be utilized to transmit reconfiguration signals to the mobile devices with installed virtual wallet applications. The reconfiguration signals include indicators specifying default payment options or default virtual card options that should be set in the virtual wallet applications.

Promotions (e.g., discounts on products and services, decreased interest rates, decreased transactional fees and/or loyalty program promotions) may be applied to purchases made using the updated default payment options or default virtual card options stored in the virtual wallet applications. The promotions may be triggered in response to receiving confirmation signals at remote computing devices which are configured to automatically activate the promotions. The confirmation signals may indicate that the default payment options or default virtual card options of the virtual wallets have been successfully updated or confirmed to be the options identified by the reconfiguration signals. In certain embodiments, the promotions are only made available for limited time periods after the reconfiguration signals are utilized to update or confirm the selected default payment options or default virtual card options.

In certain embodiments, a system is provided for managing a virtual wallet application. The system comprises a physical structure including a near-field communication component that is configured to transmit a reconfiguration signal that designates a virtual card to be a default virtual card. The reconfiguration signal is transmitted to a NFC-enabled mobile device in response to the NFC component and the NFC-enabled mobile device being placed in proximity to each other. The system further comprises a virtual wallet application stored on a non-transitory storage medium of the NFC-enabled mobile device. The virtual wallet application is configured to determine whether the virtual wallet application includes the virtual card identified by the reconfiguration signal and, in response to determining that the virtual wallet application includes the virtual card identified by the reconfiguration signal, update or confirm a default card setting of the virtual wallet application to designate the virtual card identified by the reconfiguration signal as the default virtual card.

In certain embodiments, a method is provided for managing a virtual wallet application. The method comprises configuring a NFC component included in a physical structure to transmit a reconfiguration signal that designates a virtual card to be a default virtual card, and transmitting the reconfiguration signal to a NFC-enabled mobile device in response the NFC component and the NFC-enabled mobile device being placed in proximity to each other. The method further comprises providing a virtual wallet application to a NFC-enabled mobile device, wherein the virtual wallet application is configured to determine whether the virtual wallet application includes the virtual card identified by the reconfiguration signal and, in response to determining that the virtual wallet application includes the virtual card identified by the reconfiguration signal, update or confirm a default card setting of the virtual wallet application to designate the virtual card identified by the reconfiguration signal as the default virtual card.

These and other features and advantages will become apparent from the following detailed description of illustrative embodiments thereof, which is to be read in connection with the accompanying drawings.

BRIEF DESCRIPTION OF THE DRAWINGS

The inventive principles are illustrated in the figures of the accompanying drawings which are meant to be exemplary and not limiting, in which like references are intended to refer to like or corresponding parts, and in which.

DESCRIPTION OF EXEMPLARY EMBODIMENTS

Figure 1:
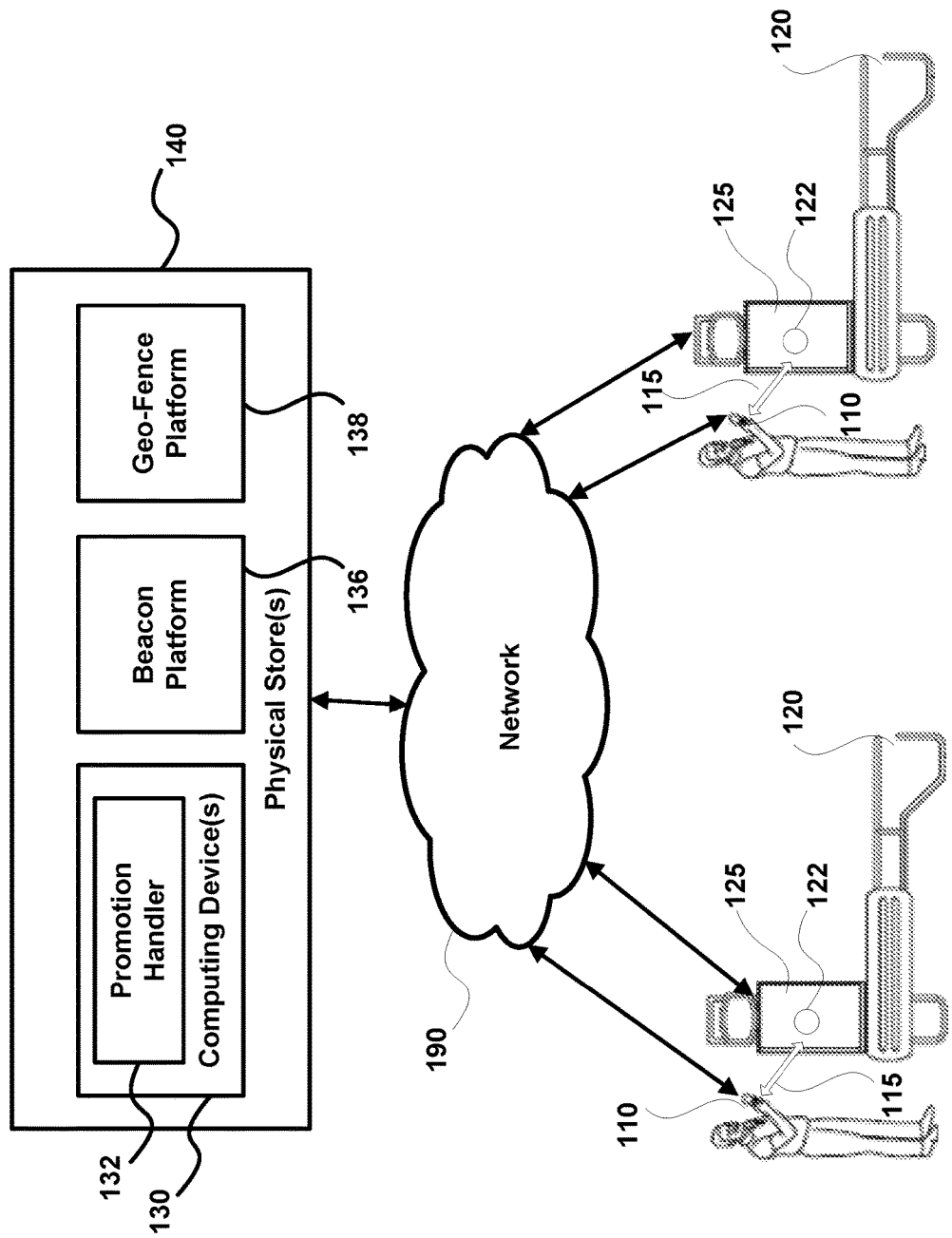
FIG. 1 is a block diagram of a system for managing virtual wallets and providing promotions according to certain embodiments of the present invention.

In accordance with certain embodiments, platforms, systems, methods and apparatuses are provided that enable virtual cards included in virtual wallets to be instantaneously prioritized as default payment options and which enable promotions to be made available in response to the default payment options being utilized to conduct transactions. In certain embodiments, the default payment options may be automatically selected, updated or confirmed using NFC technologies, geo-fencing technologies and/or beacon technologies.

In accordance with certain embodiments, a virtual card stored in a virtual wallet application is prioritized as a default payment option in response to an individual engaging a NFC-enabled sign with a mobile device. For example, a NFC-enabled sign may represent or include a poster, an advertisement or a display panel that includes a NFC component incorporated into, or attached to, its structure or housing. In certain embodiments, the NFC component that transmits the reconfiguration signal for adjusting the default card setting of the virtual wallet application can be incorporated into structures other than NFC-enabled signs, e.g., such as shopping cart corrals, kiosks, interior or exterior walls of a building, bus stop corrals, etc. When the NFC-enabled mobile device communicates with the NFC component (e.g., via a single tap), the NFC component transmits a reconfiguration signal to the mobile device which causes a virtual wallet stored on the mobile device to update or replace a setting that identifies a default card or default payment option for the virtual wallet. In response to receiving the reconfiguration signal at the mobile device, a predetermined virtual card associated with a specific card issuer (e.g., American Express, Discover, Chase, Bank of America, etc.) or specific company (e.g., a credit card, rewards card or loyalty card associated with a retailer or other business) is selected to be used as the default payment option for the virtual wallet application, assuming the predetermined virtual card is included as an option in the virtual wallet. An interface displayed on the mobile device may prompt the individual to confirm that it is permissible to update the default card in the individual's virtual wallet, or the default card may be updated automatically without requiring such confirmation. If the predetermined virtual card is already selected as the default payment option prior to receiving the reconfiguration signal, the virtual wallet application can ignore the reconfiguration and confirm selection of the predetermined virtual card. If the predetermined virtual card is not included in the virtual wallet application, an interface may prompt an individual operating the device to order or apply to receive the predetermined virtual card.

In further embodiments, beacons or geo-fencing techniques may be utilized to transmit the reconfiguration signal to the mobile device for updating the default card in the virtual wallet. The beacon-based techniques (e.g., which utilize iBeacon protocols or similar protocols) and/or geo-fencing techniques (e.g., which use GPS systems and mobile device applications to track user locations) may be utilized to detect the presence of mobile devices within an area or geographic boundary. For example, beacon-based techniques and/or geo-fencing techniques may be used to detect the presence of a mobile device within the area or geographic boundary at or near a physical store location. In response to detecting the presence of a mobile device within the area or geographic boundary, the default card in the individual's virtual wallet may be updated automatically, or a notification may be displayed on the mobile device which prompts the individual to confirm that it is permissible to update the default card in the individual's virtual wallet.

In certain embodiments, the predetermined virtual card is only prioritized as the default card for a limited period of time. During the limited period of time when the predetermined virtual card is prioritized as the default card, the individual can take advantage of certain promotions (e.g., discounts or sales) by utilizing the virtual card to make tap-to-pay purchases at a physical store location (e.g., associated with a retail business located in the vicinity of the NFC component). In certain embodiments, after the predetermined period of time expires, the promotions may expire and the virtual card that was designated as the default payment option prior to the individual engaging the NFC component is automatically reset as the default payment option once again, without requiring any action by the individual. Even before the time period expires, the individual can easily reset the default payment option to be the virtual card that was designated prior to engaging the NFC component (or to any other virtual card in the wallet) by simply selecting a button or an option on an interface associated with the virtual wallet application.

The inventive principles discussed herein provide a variety of advantages. Card issuers or companies are able to have their credit card, debit card, gift card, store card or other type payment method that is converted into a virtual card selected and prioritized as the default card in a potential customer's virtual wallet. This drives card usage because the default card is the easiest and most often chosen payment method in a virtual wallet. Moreover, because customers are enticed to make purchases within a small window of time when they are in the immediate vicinity of a business, the businesses which offer the promotions are able to attract additional customers and drive additional sales. From the customers' perspective, they are able to take advantage of discounts and other promotions that would not have been available otherwise. In addition, the automated process of selecting the default card is beneficial for the customer because the optimal virtual card (e.g., in terms of discounts and sales which are made available) is quickly and easily set as the default payment option, thus saving the customer the time and hassle of sorting through various payment methods included in a virtual wallet when making purchases or conducting transactions. Rather, the customers can take advantage of these benefits with a single tap of their mobile device on a NFC component (and/or by using geo-fencing or beacon technologies) to prompt the user to change the default card, thus requiring minimal effort and avoiding time-consuming and tedious efforts associated with providing information and installing applications.

A variety of technical features are integrated into the systems and methods to accomplish the above-described advantages. As discussed herein, settings for a virtual wallet application can be updated by configuring a NFC-component, beacon or geo-fencing system to transmit a novel reconfiguration signal that automatically adjusts settings of the virtual wallet application. This can be performed instantaneously using NFC techniques without requiring an individual to perform any other action besides placing the mobile devices near the NFC components. Alternatively, or additionally, the default card in a virtual wallet can be changed instantaneously using beacon and/or geo-fence technology to determine locations of nearby individuals and to transmit the reconfiguration signals to their mobile devices for updating of the default cards. Again, this is performed instantaneously and with minimal effort of the individual.

The embodiments described in this disclosure can be combined in various ways. Any aspect or feature that is described for one embodiment can be incorporated into any other embodiment mentioned in this disclosure. Moreover, any of the embodiments described herein may be hardware-based, software-based and/or comprise a mixture of both hardware and software elements. Thus, while the description herein may describe certain embodiments, features or components as being implemented in software or hardware, it should be recognized that any embodiment, feature or component that is described in the present application may be implemented in hardware and/or software. In certain embodiments, particular aspects are implemented in software which includes, but is not limited to, firmware, resident software, microcode, etc.

It should be recognized that any description regarding the utilization of NFC techniques to update default card settings and/or provide can also be applied or adapted for beacon-based techniques, geo-fencing techniques and/or other techniques described herein. For example, any description regarding the use of reconfiguration signals from NFC components to update default card settings and/or provide promotions also applies to reconfiguration signals provided by beacon platforms and/or geo-fencing platforms. Likewise, any description of the virtual wallet applications performing functions based on interactions with NFC components also applies to interactions with the beacon platforms and/or geo-fencing platforms.

Embodiments may include a computer program product accessible from a computer-usable or computer-readable medium providing program code for use by or in connection with a computer or any instruction execution system. A computer-usable or computer-readable medium may include any apparatus that stores, communicates, propagates or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings in which like numerals represent the same or similar elements and initially to FIG. 1 which illustrates an exemplary system 100 for managing a virtual wallet application and providing promotions in accordance with certain embodiments of the present invention. In certain embodiments, the system includes one or more NFC-enabled mobile devices 110 that are operated by customers or other individuals, one or more physical structures 120 that include one or more NFC-enabled signs 125 (e.g., NFC-enabled advertisements, display panels, corrals and/or posters), and one or more computing devices 130

(e.g., server devices and/or personal computing devices) that enable discounts to be redeemed at one or more physical stores 140 (e.g., retail locations or other business locations). Each of the components (and/or sub-components) shown in FIG. 1 may be configured to communicate directly with each other or over the network 190 via wired or wireless combination links, or a combination of the two. For example, the mobile devices 110, the physical structures 120, the NFC-enabled signs 125, the computing devices 130, the physical stores 140, the promotion handler 132, the geo-fence platform 136 and/or the beacon platform 138 may be configured to communicate directly with each other and/or to communicate with each other over a network 190, e.g., such as one that includes the Internet, a local area network (LAN), a personal area network, a wide area network, an extranet, a cellular network, an intranet and/or other type of network.

The computing devices 130 may represent or include server devices, desktop computers, laptop computers, tablet devices, or other types of computing devices that are configured to communicate over the network 190. The mobile devices 110 may represent smart phones, cell phones, personal digital assistants, tablets or any other portable computing devices. Each sign 125, structure 120 and/or mobile device 110 may be integrated with or include a NFC component 122. The NFC component 122 may represent any type of device that is able to establish a communication connection in accordance with NFC standards, protocols or specifications. The mobile devices 110, structures 120, signs 125, computing devices 130, physical stores 130, beacon platforms 136, and geo-fence platforms 138 may be equipped with and/or coupled to one or more computer storage devices (e.g., RAM, ROM, PROM, SRAM, etc.), one or more processor devices (e.g., a central processing unit) that are capable of executing computer program instructions, and one or more transceiver devices capable of communicating over the network 190. The computer storage devices may be physical, non-transitory mediums in certain embodiments.

In certain embodiments, the NFC component 122 may represent a passive, unpowered device or chip (also referred to as a "NFC tag") that can be activated or powered by an electromagnetic field. In certain embodiments, the NFC component 122 may represent a device that includes a power supply and which actively generates an electromagnetic field in compliance with the NFC protocols. The connection between the NFC components 122 of the mobile devices 110 and NFC-enabled signs 125 may enable one-way or two-way communication between the mobile devices 110 and the signs 125.

In certain embodiments, the mobile devices 110 and the NFC-enabled signs 125 may communicate using a passive communication mode or an active communication mode. In passive communication mode, the signs 125 may include an unpowered chip or tag that lacks a power source. In order to facilitate communication in this mode, the NFC component 122 associated with the mobile device 110 may generate an electromagnetic carrier field that can be utilized to power the chip when the individual taps the mobile device 110 against the chip or brings the mobile device 110 into close proximity with the chip. On the other hand, in active communication mode, both the sign 120 and the mobile device 110 include power supplies and generate their own respective electromagnetic field. The mobile device 110 and the NFC component 122 of the sign 125 may communicate by alternately generating their own electromagnetic fields and deactivating their fields while awaiting data.

In response to the mobile device 110 engaging a NFC-enabled sign 125 (or other NFC-enabled structure 120), the NFC component 122 of the sign 125 may transmit a reconfiguration signal 115 to the mobile device 110 which causes a virtual wallet application stored on the mobile device 110 to reconfigure or update a default payment option associated with a virtual card in the virtual wallet application. The reconfiguration signal 115 may include a first payload portion for identifying a virtual card to be selected as the default card. The first payload portion may additionally, or alternatively, identify a listing of virtual cards in an order of priority. The virtual card having the greatest priority may be selected if available in the virtual wallet application (e.g., if the virtual wallet stores information for a payment option corresponding to the virtual card), while the remaining virtual cards are selected in decreasing order of priority based on their availability in the virtual wallet application. For example, a card issuer or company may offer a plurality of payment methods (e.g., a variety of different credit cards or debit cards) to its customers. The first payload portion of the reconfiguration signal 115 may include information that identifies each of the different payment methods in an order of priority and which indicates that corresponding virtual cards stored on the mobile device 110 should be selected based on the order. In certain embodiments, in response to determining that the virtual card(s) identified by the reconfiguration signal is not included in the virtual wallet application, the virtual wallet application and/or computing device provides an interface on the mobile device 110 which enables a physical card corresponding to the virtual card to be obtained or ordered (e.g., which enables an individual to order a credit card, debit card or other card that can be input to the virtual wallet application as a virtual card to take advantage of certain promotions).

The reconfiguration signal 115 may include a second payload portion that includes a time indicator which specifies a length of time the virtual wallet application should prioritize the virtual card as the default card. The signal 115 transmitted to the mobile device 110 may further cause the mobile device 110 to communicate with a computing device 130 over a network 190 to enable promotions to be made accessible to the individual utilizing the mobile device 110. For example, the reconfiguration signal 115 may cause the mobile device 110 to update loyalty or reward card information (e.g., stored on the mobile device 110 itself or remotely on the remote computing device 130) associated with a company in any manner that permits the individual to access the promotions, or may cause the mobile device 110 to communicate with a remote computing device 110 associated with a card issuer to enable the promotions. After the reconfiguration signal 115 updates the default card setting of the virtual wallet application (or confirms that the predetermined virtual card identified by the reconfiguration signal 115 is already set as the default payment option), the mobile device 110 may automatically transmit a confirmation signal over the network 190 to a remote computing device 130 to confirm that default card setting was successfully updated or confirmed, and further to trigger the computing device 130 to activate promotions to be made available when the default card is utilized to make purchases or conduct other transactions.

In certain embodiments, the NFC component 122 may be configured to change the settings of the virtual wallet application by communicating via an application programming interface (API) associated with the virtual wallet application. For example, the reconfiguration signal 115 transmitted by the NFC component 122 may be formatted according to protocols that are able to communicate with a commercially available virtual wallet application (e.g., associated with Android Pay or Google Wallet) or other virtual wallet application. As mentioned above, the reconfiguration signal 115 may include information that identifies the card (or listing of cards) that is to be designated as the default card, as well as a time indicator that indicates how long the card is to be designated as the default card. In certain embodiments, after the individual engages the NFC component 122 with the mobile device 110, the individual may be prompted to provide one or more inputs (e.g., a fingerprint confirmation and/or a selection of a confirmation button) which verifies that the individual is willing to accept updating of the default card in the virtual wallet application. Assuming the individual verifies that he or she is willing to update the default card, the virtual wallet application automatically updates or confirms the default card settings based on the information in the reconfiguration signal 115 without requiring any further effort or input by the individual.

In certain embodiments, the NFC component 122 of a NFC-enabled sign 125 may further cause one or more digital coupons to be transferred to the mobile device 110 which enable the mobile device 110 to take advantage of the promotions. The one or more digital coupons may be transferred to the mobile device 110 directly by the NFC component 122 or they may be retrieved by the mobile device 110 over the network 190 from a remote computing device 130 (e.g., a server) associated with a business that is offering the promotions.

In certain embodiments, the one or more computing devices 130 include a promotion handler 132 that is configured to enable promotions to be provided to individuals who utilize their mobile devices 110 to engage a NFC-enabled sign 125 or other NFC-enabled structure 120. For example, the mobile devices 110 may automatically transmit a confirmation signal to a computing device 130 over the network 190 in response to updating a default virtual card in a virtual wallet application and/or in response to the mobile devices 110 engaging a NFC component 122 of a NFC-enabled sign 125 or structure 120. The confirmation signal received by the computing device 130 may include an identifier that uniquely identifies the virtual card or payment option that was selected as the default card, the individual associated with the payment option of mobile device 110, the mobile device 110, a loyalty card account, and/or a user account associated with the individual. For example, the confirmation signal may comprise a card identifier that identifies the virtual card that was selected as the default card so that the promotion handler 132 can activate promotions for purchases made using the default card. The confirmation signal may further include an indication of whether or not the default virtual card was successfully updated. The confirmation signal may generally include any other information related to the NFC interaction involving the mobile device 110 and the NFC component 122 of the sign 125 or structure 120, and/or to the settings of the virtual wallet application.

The manner in which the discounts or other promotions are made available to individuals may vary. In certain embodiments, the discounts are applied automatically when an individual makes a tap-to-pay purchase using the updated default card at the physical store location 140 and/or when the individual makes an in-app purchase using the default card (e.g., making a purchase via a website or application that access the virtual wallet application for payment information). For example, based on the information in the confirmation signal, the promotion handler 132 may automatically designate a selected default card as being eligible for certain promotions and the promotions may be applied automatically when it is detected that the default card is being utilized as a point of sale (POS) system to make a purchase. Additionally, or alternatively, when the individual engages a NFC-enabled sign 125 or structure 120, the loyalty card account or user account for the individual may be automatically updated by the promotion handler 132 to enable the promotions to be accessed by the individual. When the individual is making a purchase, the individual can provide his or her loyalty card information and the promotions may be automatically applied when the individual uses the default card. Additionally, or alternatively, obtaining the discounts may initially require a digital coupon to be scanned prior to submitting payment. For example, a digital coupon may be transferred to the mobile device 110 of the individual after the individual engages a NFC-enabled sign 125 or other NFC-enabled structure 120. The individual can then present the digital coupon during the checkout process to receive a discount or other promotion. The discounts or promotions may be made available to individuals in other ways as well.

The period of time when the predetermined virtual card is set as the default card, and when the promotions are made available, may vary. For example, in certain embodiments the time period is limited to a particular window of time (e.g., one hour, 90 minutes or one day) to entice individuals to make purchases while they are still located in the vicinity of a physical store 140 where the promotions or discounts can be redeemed, or to entice individuals to take advantage of promotions available via in-app purchases. The promotion handler 132 and/or the virtual wallet application may include a timer and/or a clock to determine when the predetermined time period has expired. After this period of time expires, the previously selected default card (e.g., the card which was selected as the default card prior to the individual engaging the NFC component) is automatically reset as the default card without requiring any action by the individual. In other embodiments, the default card is permanently set as the default card (at least until an individual explicitly changes the settings to select a different default card) and the promotions are made available indefinitely. The promotion handler 132 may be configured to enable and disable availability of promotions based on these time periods or any other time periods.

The NFC-enabled signs 125 and/or structures 120 may be situated in a variety of different locations and incorporated in a variety of different structures 120. In certain embodiments, the NFC-enabled signs 125 and/or structures 120 are located in or near a physical store 140 associated with a business location. In other embodiments, the NFC-enabled signs 125 and/or structures 120 are located remotely in locations separate from the business locations. While FIG. 1 illustrates the NFC component 122 as being integrated into NFC-enabled signs 125 coupled to shopping cart corral structures 120, the NFC components 122 may generally be integrated into any structure 120 including, but not limited to, shopping cart corral frames, advertisement display cases, advertisements or posters, exterior or interior walls of buildings, bus stop corrals, pole structures (e.g., light poles or sign poles), kiosk terminals, point of sale (POS) systems, parking garages and other types of structures and devices. Thus, it should be recognized that NFC components 122 discussed herein are not necessarily tied to sign structures 125, and can generally be integrated into any structure 120 to implement the techniques discussed in this disclosure. Any description in this disclosure which relates to utilizing NFC-enabled signs 125 to update default card settings and/or provide promotions also applies to any other NFC-enabled structure 120.

While portions of this disclosure describe the use of particular protocols to update a default card in a virtual wallet application, it should be understood that machine readable codes (e.g., quick response codes or bar codes) or other types of contactless communication protocols (e.g., RFID techniques) may alternatively be used to update a default card in a virtual wallet using similar principles as described above. For example, RFID techniques may be utilized to transmit the above-described reconfiguration signal which adjusts the settings of the virtual wallet, or an individual's mobile device can scan a machine readable code which causes the settings of the virtual wallet to be reconfigured in a similar manner as described above with respect to the reconfiguration signals. Thus, any of the details discussed herein which involve using NFC, beacon and/or geo-fencing technology to adjust such settings can be varied accordingly to accommodate techniques that involve RFID or machine readable codes.

Certain embodiments may further utilize smart kiosks, or other types of kiosks, to update a default card in a virtual wallet. For example, rather than engaging a NFC component 122 that is included in a sign or advertisement, an individual's mobile device may engage a NFC component 122 that is integrated in a structure 120 of a kiosk device (or any other structure that includes a NFC component) and connected to appropriate circuitry within the kiosk. Interaction with the NFC component 122 in the kiosk can similarly cause a default card in a virtual wallet application to be updated and/or promotions to be activated.

In even further embodiments, a default card in a virtual wallet may be updated without any interaction with a NFC component 122. Instead, beacons or geo-fencing techniques may be utilized to update the default card in the virtual wallet. For example, as shown in FIG. 1, the physical stores 140 may include a beacon platform 136 and a geo-fence platform 138 for implementing beacon-based communication techniques (e.g., which utilize iBeacon protocols or similar protocols) and/or geo-fencing techniques to detect the presence of mobile devices within an area or geographic boundary (e.g., within or near a physical store 140). The beacon platform 136 and a geo-fence platform 138 may be coupled to the computing devices 130 and the computing devices may be configured to execute programs and process information for implementing the beacon-based and geo-fencing techniques. The beacon platform 136 can include beacon hardware and related equipment (e.g., iBeacon-compatible hardware transmitters and/or transceivers), as well as any related software and transmission protocols. The geo-fence platform 138 can include any related software, hardware and/or equipment for defining virtual zones (or geo-fences) and tracking locations of individuals (e.g., using GPS equipment, systems and associated software). Both the beacon platform 136 and the geo-fence platform 138 may be configured to communicate with the virtual wallet application and/or other applications (e.g., such as location tracking applications) installed on the mobile devices 110. In response to detecting the presence of a mobile device 110 within an area or geographic boundary using the beacon platform 136 and the geo-fence platform 138, the default card in the individual's virtual wallet may be updated automatically, or a notification may be displayed on the mobile device which prompts the individual to confirm that it is permissible to update the default card in the individual's virtual wallet application.

In certain embodiments, the beacon platform 136 and geo-fence platform 138 may communicate with the virtual wallet application, or other application installed on an individual's mobile device 110, to update the default payment option of the individual. For example, with respect to the beacon platform 136, one or more beacons may be located in a particular area (e.g., a store or shopping center) and the beacons may broadcast packets comprising the above-described reconfiguration signal 115 over a wireless personal area network (e.g., Bluetooth Low Energy), which are detected and collected by the individual's mobile device 110. In response to receiving the packets comprising the reconfiguration signal, the virtual wallet application or other application installed on the mobile device 110 may prompt the individual to switch the default payment option in the virtual wallet application and/or the default payment option may automatically be updated without any confirmation from the individual. Similarly, with respect to the geo-fence platform 138, the virtual wallet application or other application installed on the individual's mobile device may detect when the individual has crossed a boundary associated with a geo-fenced area (or other virtual area). When the individual is located within the geo-fenced area or has crossed a boundary associated with the area, the virtual wallet application may automatically update the default card setting or prompt the individual to switch the default payment option in the virtual wallet application. The geo-fence platform 138 may further permit administrators or business personnel to customize and define the geo-fence zones (e.g., via interfaces displayed on the computing devices 130) utilized to transmit the reconfiguration signals 115.

In certain embodiments, the settings of the NFC-enabled signs 125, NFC-enabled structures 120, beacon platform 136 and/or geo-fence platform 137 can be updated to change the predetermined virtual cards that are identified by the reconfiguration signals (e.g., updated to be a card from a different card issuer or store) and other types of related information (e.g., promotions that are made available, the time limits associated with activating the promotions and/or time limits associated with prioritizing the virtual cards). An administrator or other individual can utilize the computing devices 130 to update the settings of the NFC components that provide the reconfiguration signals by transmitting signals. The computing devices 130 may display appropriate interfaces for updating the settings, and may communicate with the NFC-enabled signs 125, NFC-enabled structures 120, beacon platform 136 and/or geo-fence platform 137 (and/or related transceivers and circuitry coupled to these components) over the network 190 to update the settings.

Figure 2:
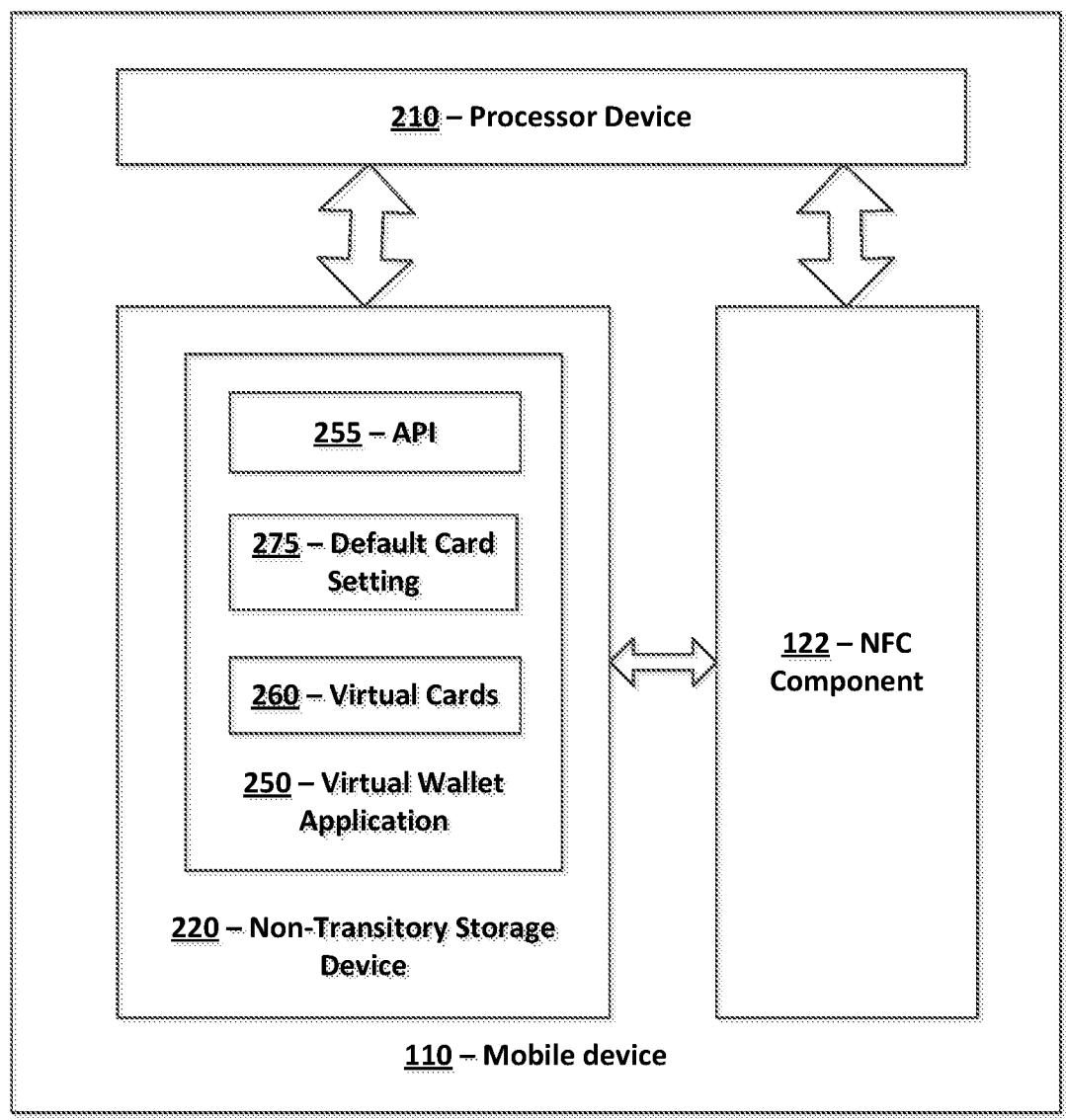
FIG. 2 is a block diagram of an exemplary mobile device according to certain embodiments of the present invention.

FIG. 2 is a block diagram of an exemplary mobile device 110 according to certain embodiments of the present invention. The mobile device 110 comprises, inter alia, one or more processor devices 210 (e.g., CPUs), one or more non-transitory computer storage devices 220, and one or more NFC components 122. The one or more non-transitory computer storage devices 220 are configured to store computer instructions that are executable by the one or more processors. The computer instructions may include any instructions associated with the virtual wallet application 250 and other applications installed on the mobile device 110.

The virtual wallet application 250 may be configured to securely store all information associated with application using encryption protocols and/or cryptographic protocols, and to securely conduct transactions (e.g., using tokenization and/or encryption key protocols). The virtual wallet application 250 provides interfaces on the mobile device which enable individuals to input information utilized to create virtual cards 260 corresponding to one or more payment method, loyalty card programs or the like. The virtual wallet application 250 may store information associated with each of the inputted virtual cards 260. For example, each virtual card 260 stored in the virtual wallet application 250 may include some or all of the following information: card or account numbers, cardholder or card owner names, security codes, billing addresses, card type, associated financial institutions or businesses, and/or other related information. The virtual cards 260 may correspond to credit cards, debit cards, store cards, loyalty cards, reward cards, gift cards, loyalty program cards, bank account payment information and options, or any other card or information associated with a payment option or account associated with a business.

An individual operating the mobile device 110 may utilize the virtual wallet application 250 to conduct transactions (e.g., to make purchases, to apply loyalty card rewards, etc.). In certain embodiments, when conducting a transaction, the individual can select a specific virtual card 260 to be used for the transaction and or can use more easily utilize a virtual card associated with a default card setting 275 to conduct a transaction (e.g., by simply opening the application and placing the NFC-enabled mobile device 110 near a NFC component 122 without having to select a specific virtual card 260 to be used in the transaction). In certain embodiments, the default card setting 275 may represent a variable or parameter that uniquely identifies a virtual card 260 included in the virtual wallet application 250. As explained above, reconfiguration signals 115 may be received via a communication channel established between the NFC component 122 of the mobile device 115 and the NFC component 122 to select one of the virtual cards 260 stored in the virtual wallet application 250 by updating the default card setting 275. Promotions may then be enabled if the individual uses the default card to conduct transactions.

In certain embodiments, the virtual wallet application 250 includes an API 255 that enables properly formatted signals and information to be received and processed by the virtual wallet application 250. The API 255 may comprise a system of tools and resources that enable third parties (e.g., card issuers, businesses or other entities) to communicate with the virtual wallet application 250 and/or to build applications for communicating with the virtual wallet application 250. In certain embodiments, the reconfiguration signal 115 and all other communications received by, or transmitted by, the virtual wallet application 250 are formatted according to the API specifications. The API 255 may be particularly useful in embodiments where the virtual wallet application 250 is provided by a widely available virtual wallet application 250 (e.g., such as Apple Pay, Android Pay or Google Wallet) and third-party entities, such as card issuers and businesses wish to communicate with the virtual wallet application 250 for implementing the techniques discussed herein.

Figure 3:
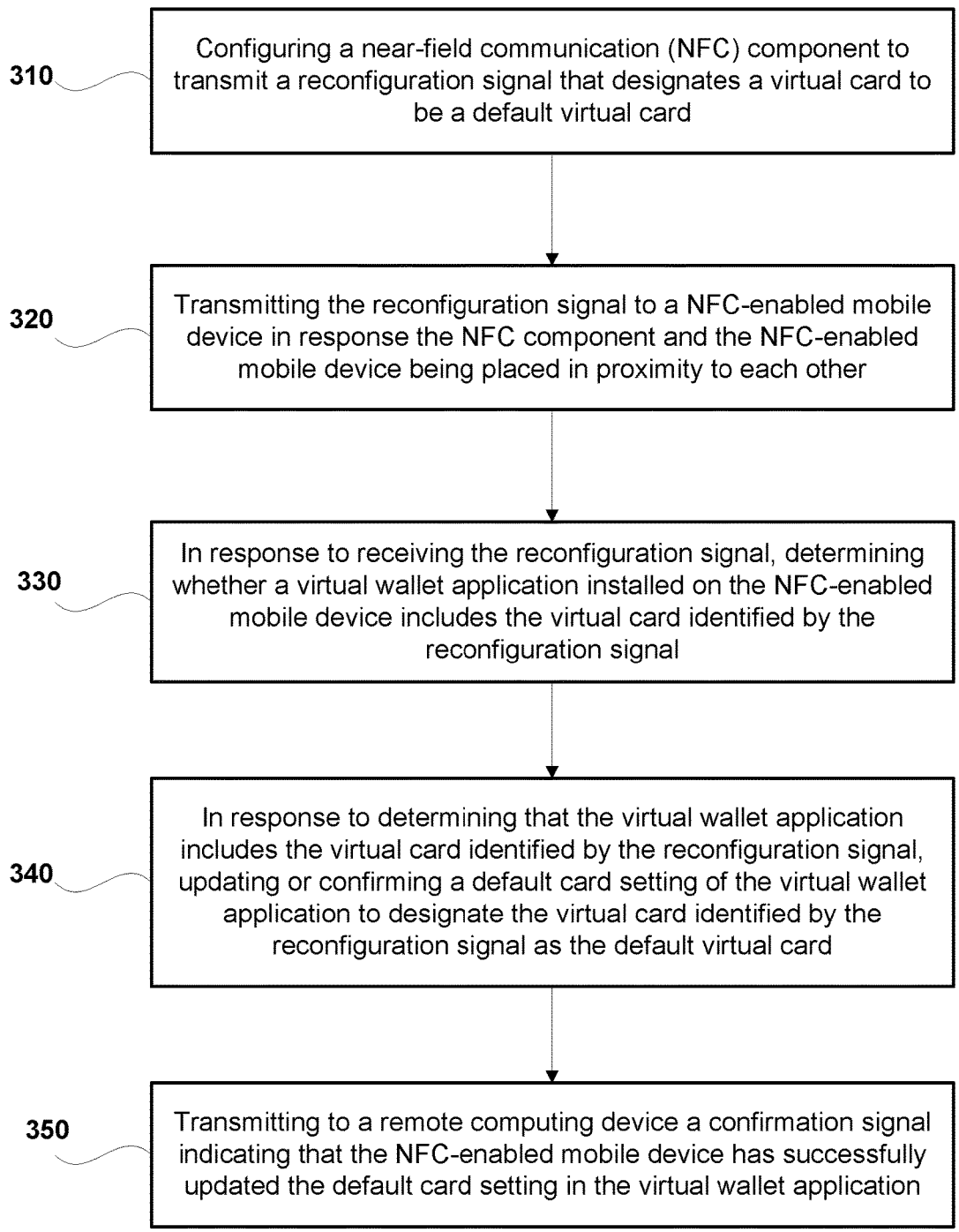
FIG. 3 discloses a method for providing promotions in accordance with certain embodiments of the present invention.

FIG. 3 is a flow chart illustrating a method 300 of updating a default virtual card in a virtual wallet application 250 according to certain embodiments. Method 300 is merely exemplary and is not limited to the embodiments presented herein. Method 300 can be employed in many different embodiments or examples not specifically depicted or described herein. In certain embodiments, the activities or steps of method 300 can be performed in the order presented. In other embodiments, the activities or steps of method 300 can be performed in any suitable order. In still other embodiments, one or more of the activities or steps of method 300 can be combined or skipped. In certain embodiments, one or more components of the system of 100 in FIG. 1 and/or the virtual wallet application 250 in FIG. 2 may be configured to perform method 300 and/or one or more of the activities or steps of method 300. In these or other embodiments, one or more of the activities or steps of method 300 can be implemented as one or more computer instructions configured to run at one or more processors and configured to be stored at one or more non-transitory memory storage devices 220.

In step 310, a NFC component 122 is configured to transmit a reconfiguration signal 115 that designates a virtual card 260 in a virtual wallet application 250 to be a default virtual card. For example, an individual may enter information for a plurality of virtual cards 260 (e.g., card numbers, cardholder name, security code, billing address, etc.) into the virtual wallet application 250 that stores the information in a secured manner. The NFC component 122 is configured to emit a reconfiguration signal 115 that is able to identify a specific virtual card 260 (or a prioritized listing of virtual cards 260) to be a default virtual card. The NFC component 122 may be integrated into a NFC-enabled sign 125 or any other NFC-enabled structure 120 (e.g., a kiosk, shopping cart corral, wall, etc.). The virtual card 260 identified by the signal may correspond to a payment option (e.g., a credit card, debit card or gift card), a loyalty card, a rewards card or a store card (e.g., a store finance card or store-branded card).

In step 320, the reconfiguration signal 115 is transmitted to a NFC-enabled mobile device 110 in response the NFC component 122 and the NFC-enabled mobile device 110 being placed in proximity to each other. The reconfiguration signal 115 can be transmitted utilizing active or passive communication techniques.

In step 330, a determination is made as to whether a virtual wallet application 250 installed on the NFC-enabled mobile device 110 includes the virtual card 260 identified by the reconfiguration signal 115 in response to receiving the reconfiguration signal 115 at the mobile device 110. For example, when the NFC signal is received by the mobile device 110, it may be decoded and the decoded information may specify a specific virtual card or set of virtual cards (e.g., a virtual card or set of virtual cards associated with a specific card issuer, company or business). The virtual wallet application 250 may then compare the decoded information to the virtual cards 260 stored in the virtual wallet application 250 to determine whether the virtual card 260 identified by the reconfiguration signal 115 is included in the wallet.

In step 340, in response to determining that the virtual wallet application includes the virtual card identified by the reconfiguration signal, a default card setting 275 of the virtual wallet application 250 is updated to designate the virtual card 260 identified by the reconfiguration signal 115 as the default virtual card. A virtual card 260 that is selected as the default virtual card will automatically be used by the virtual wallet to make purchases or conduct other transactions, unless an individual specifically selects another card to conduct the transaction.

In step 350, a confirmation signal is transmitted to a remote computing device (e.g., computing device 130) indicating that the NFC-enabled mobile device has successfully updated the default card setting 275 in the virtual wallet application 250. In certain embodiments, the configuration signal may be wirelessly transmitted over a network 190 that comprises a local area network and/or the Internet to confirm that the default card setting 275 is set to the virtual card identified in the reconfiguration signal.

Figure 4:
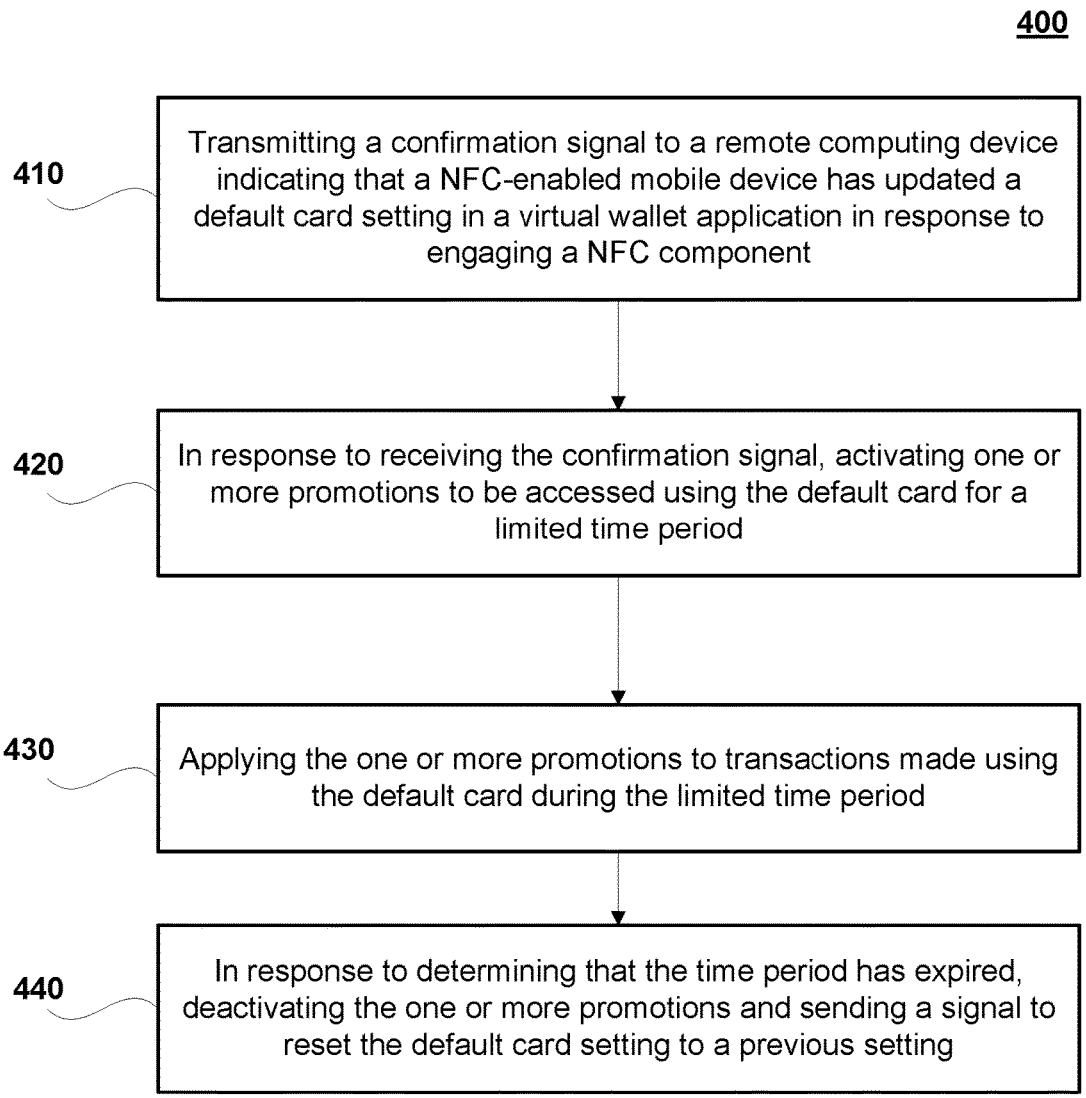
FIG. 4 discloses a method for providing promotions in accordance with certain embodiments of the present invention.

FIG. 4 is a flow chart illustrating a method 400 for providing promotions according to certain embodiments. Method 400 is merely exemplary and is not limited to the embodiments presented herein. Method 400 can be employed in many different embodiments or examples not specifically depicted or described herein. In certain embodiments, the activities or steps of method 400 can be performed in 400 order presented. In other embodiments, the activities or steps of method 400 can be performed in any suitable order. In still other embodiments, one or more of the activities or steps of method 400 can be combined or skipped. In certain embodiments, the one or more components of the system of 100 in FIG. 1 (e.g., the promotion handler 132) and/or the virtual wallet application 250 in FIG. 2 may be configured to perform method 400 and/or one or more of the activities or steps of method 400. In these or other embodiments, one or more of the activities or steps of method 400 can be implemented as one or more computer instructions configured to run at one or more processors and configured to be stored at one or more non-transitory memory storage devices 220.

In step 410, a confirmation signal is transmitted to a remote computing device 130 indicating that a NFC-enabled mobile device 110 has updated a default card setting 275 in a virtual wallet application 250 in response to engaging a NFC component 122. The virtual wallet application 250 may be configured to automatically send the confirmation signal after the default card setting 275 has been updated to be the virtual card 260 identified by a reconfiguration signal 115 and/or after the virtual wallet application 250 confirms that the default card setting 275 is already set to the virtual card 260 identified by the reconfiguration signal 115.

In step 420, one or more promotions to be accessed using the default card are activated for a limited time period in response to receiving the confirmation signal. Any type of promotion may be activated. Exemplary promotions may include discounts for products or services being purchased, loyalty program rewards, decreased interest rates (e.g., for credit cards or debit cards), decreased transaction fees, etc. The promotions may be enabled for a limited time period (e.g., an hour, a day, a week or a month) to entice individuals to immediately purchase products and/or services at retail locations.

In step 430, the one or more promotions are applied to transactions made using the default card during the limited time period. The promotions may be associated with the virtual card 460 selected as the default virtual card such that using the virtual card (e.g., at a POS system and a device that access a loyalty card database) to conduct transactions (e.g., to make purchases) permits the promotions to be obtained. The transactions may include tap-to-pay or in-app purchases. The virtual wallet application 250 may require verification credentials (e.g., fingerprint verification or password verification) to be input before conducting the transaction.

In step 440, in response to determining that the time period has expired, one or more promotions are deactivated and a signal is sent to reset the default card setting 275 to a previous setting. The signal may be sent by a remote computing device 130 and/or the virtual wallet application 250. Resetting the default card setting 275 to a previous setting may involve designating another virtual card 260 (which was previously selected as the virtual card 260 immediately prior to a reconfiguration signal 115 being received by the mobile device 110) to be the default virtual card. If the virtual card 260 that was identified by the reconfiguration signal 115 is the same as the virtual card 260 that was already selected prior to receiving the reconfiguration signal 115, then the virtual wallet application 250 may ignore the signal to reset the default card setting 275 and the virtual card 260 may remain as the default virtual card.

While there have been shown and described and pointed out various novel features of the invention as applied to particular embodiments thereof, it should be understood that various omissions, substitutions and changes in the form and details of the systems and methods described may be made by those skilled in the art without departing from the spirit of the invention. Amongst other things, the steps in the methods may be carried out in different orders in cases where such may be appropriate. Those skilled in the art will recognize that the particular hardware and devices that are part of the system described herein, and the general functionality provided by and incorporated therein, may vary in different embodiments of the invention. Accordingly, the particular system components are provided for illustrative purposes and to facilitate a full and complete understanding and appreciation of the various aspects and functionality of particular embodiments of the invention as realized in the system and method embodiments thereof. Those skilled in the art will appreciate that the invention can be practiced in other than the described embodiments, which are presented for purposes of illustration and not limitation.

What is claimed is:

1. A system for managing a virtual wallet application comprising:
   a physical structure including a near-field communication (NFC) component that is configured to transmit a reconfiguration signal that designates a virtual card to be a default virtual card, wherein the reconfiguration signal is transmitted to a NFC-enabled mobile device in response to the NFC component and the NFC-enabled mobile device being placed in proximity to each other;
   the virtual wallet application stored on a non-transitory storage medium of the NFC-enabled mobile device, wherein the virtual wallet application is configured to:
      determine whether the virtual wallet application includes the virtual card identified by the reconfiguration signal;
      in response to determining that the virtual wallet application includes the virtual card identified by the reconfiguration signal, update or confirm a default card setting of the virtual wallet application to designate the virtual card identified by the reconfiguration signal as the default virtual card; and
      conduct one or more transactions using the default virtual card; and
   a remote computing device in communication with the NFC-enabled mobile device over a network, wherein the remote computing device is configured to:
      receive a confirmation signal from the NFC-enabled mobile device indicating that the NFC-enabled mobile device has successfully updated or confirmed the default card setting in the virtual wallet application to designate the virtual card identified by the reconfiguration signal as the default virtual card; and
      enable one or more promotions to be obtained in connection with utilizing the default virtual card to conduct the one or more transactions,
   wherein the virtual card is designated as the default virtual card for a limited time period and, in response to determining that the limited time period has expired, the virtual wallet application automatically resets the default card setting to a previous setting which designated a second virtual card in the virtual wallet application as the default virtual card.

2. The system of claim 1, wherein the limited time period is specified by one of: a signal from the remote computing device, the reconfiguration signal that is transmitted to the NFC-enabled mobile device or a pre-defined time setting of the virtual wallet application.

3. The system of claim 1, wherein the one or more promotions are made available for the limited time period during which the virtual card is designated as the default virtual card; and wherein the one or more transactions include one or more tap-to-pay purchases or one or more in-app purchases.

4. The system of claim 1, wherein the virtual wallet application includes a plurality of virtual cards and the plurality of virtual cards include information associated with credit cards, debit cards, loyalty cards, rewards cards or store cards; and wherein the default virtual card identified by the reconfiguration signal is one of the plurality of virtual cards.

5. The system of claim 1, wherein the physical structure is a shopping cart corral, a poster, a sign, a wall or a display panel.

6. The system of claim 1, wherein the default virtual card designated by the reconfiguration signal is included in a list that identifies a plurality of virtual cards and the default virtual card is selected based, at least in part, on priority information assigned to the plurality of virtual cards and availabilities of the plurality of virtual cards in the virtual wallet application.

7. The system of claim 1, wherein, in response to determining that the virtual card is not included in the virtual wallet application, an interface is displayed on the NFC-enabled mobile device which enables a physical card corresponding to the virtual card to be obtained or ordered.

8. A method for managing a virtual wallet application comprising:
configuring a near-field communication (NFC) component included in a physical structure to transmit a reconfiguration signal that designates a virtual card to be a default virtual card;
transmitting the reconfiguration signal to a NFC-enabled mobile device in response to the NFC component and the NFC-enabled mobile device being placed in proximity to each other;
providing the virtual wallet application to the NFC-enabled mobile device, wherein the virtual wallet application is configured to:
determine whether the virtual wallet application includes the virtual card identified by the reconfiguration signal;
in response to determining that the virtual wallet application includes the virtual card identified by the reconfiguration signal, update or confirm a default card setting of the virtual wallet application to designate the virtual card identified by the reconfiguration signal as the default virtual card; and
conduct one or more transactions using the default virtual card; and
providing a remote computing device that is in communication with the NFC-enabled mobile device over a network, wherein the remote computing device is configured to:
receive a confirmation signal from the NFC-enabled mobile device indicating that the NFC-enabled mobile device has successfully updated or confirmed the default card setting in the virtual wallet application to designate the virtual card identified by the reconfiguration signal as the default virtual card; and
enable one or more promotions to be obtained in connection with utilizing the default virtual card to conduct the one or more transactions,
wherein the virtual card is designated as the default virtual card for a limited time period and, in response to determining that the limited time period has expired, the virtual wallet application automatically resets the default card setting to a previous setting which designated a second virtual card in the virtual wallet application as the default virtual card.

9. The method of claim 8, wherein the limited time period is specified by one of: a signal from the remote computing device, the reconfiguration signal that is transmitted to the NFC-enabled mobile device or a pre-defined time setting of the virtual wallet application.

10. The method of claim 8, wherein the one or more promotions are made available for the limited time period during which the virtual card is designated as the default virtual card; and wherein the one or more transactions include one or more tap-to-pay purchases or one or more in-app purchases.

11. The method of claim 8, wherein the virtual wallet application includes a plurality of virtual cards and the plurality of virtual cards include information associated with credit cards, debit cards, loyalty cards, rewards cards or store cards; and wherein the default virtual card identified by the reconfiguration signal is one of the plurality of virtual cards.

12. The method of claim 8, wherein the physical structure is a shopping cart corral, a poster, a sign, a wall or a display panel.

13. The method of claim 8, wherein the default virtual card designated by the reconfiguration signal is included in a list that identifies a plurality of virtual cards and the default virtual card is selected based, at least in part, on priority information assigned to the plurality of virtual cards and availabilities of the plurality of virtual cards in the virtual wallet application.

14. The method of claim 8, wherein, in response to determining that the virtual card is not included in the virtual wallet application, an interface is displayed on the NFC-enabled mobile device which enables a physical card corresponding to the virtual card to be obtained or ordered.

* * * * *